United States Patent
Rossi et al.

(10) Patent No.: US 9,207,683 B2
(45) Date of Patent: Dec. 8, 2015

(54) FLOW METER DEVICE AND METHOD OF OPERATION

(75) Inventors: Sergio Rossi, Genoa (IT); Renato Bessegato, Montebelluna (IT)

(73) Assignee: Infineon Technologies Austria AG, Villach (AT)

( * ) Notice: Subject to any disclaimer, the term of this patent is extended or adjusted under 35 U.S.C. 154(b) by 756 days.

(21) Appl. No.: 13/355,081

(22) Filed: Jan. 20, 2012

(65) Prior Publication Data

US 2013/0191045 A1 Jul. 25, 2013

(51) Int. Cl.
| | |
|---|---|
| G01F 1/58 | (2006.01) |
| G01F 3/06 | (2006.01) |
| G05D 7/06 | (2006.01) |
| G01F 1/10 | (2006.01) |
| G01F 1/115 | (2006.01) |
| G01F 15/06 | (2006.01) |

(52) U.S. Cl.
CPC .............. G05D 7/0635 (2013.01); G01F 1/103 (2013.01); G01F 1/115 (2013.01); G01F 15/068 (2013.01)

(58) Field of Classification Search
CPC ............... G01F 1/00; G01F 1/56; G01F 1/58; G01F 3/00; G01F 3/06; G01F 7/00; G08B 21/00
USPC ............... 702/45, 33, 41, 46, 50, 81, 84, 127, 702/142, 145; 210/85, 87, 97, 282, 739; 73/1.16, 1.27–1.28, 195–196, 861, 73/861.77, 861.79; 340/606, 609–610

See application file for complete search history.

(56) References Cited

U.S. PATENT DOCUMENTS

| | | | |
|---|---|---|---|
| 5,481,259 A | 1/1996 | Bane | |
| 5,876,610 A * | 3/1999 | Clack et al. | 210/739 |
| 6,661,112 B2 | 12/2003 | Zeier et al. | |
| 2004/0199477 A1 | 10/2004 | Garcia-Moreno | |
| 2007/0241930 A1 * | 10/2007 | Qureshi et al. | 340/870.02 |
| 2007/0284293 A1 | 12/2007 | Pitchford et al. | |
| 2011/0290036 A1 * | 12/2011 | Pflum | 73/861.08 |

FOREIGN PATENT DOCUMENTS

| | | |
|---|---|---|
| CN | 2369220 Y | 3/2000 |
| CN | 101149282 A | 3/2008 |
| CN | 201716047 U | 1/2011 |
| DE | 26 19 226 A1 | 11/1977 |
| DE | 197 14 351 A1 | 10/1998 |
| DE | 103 56 069 A1 | 6/2005 |
| WO | 0070313 A1 | 11/2000 |

* cited by examiner

*Primary Examiner* — Toan Le

(74) *Attorney, Agent, or Firm* — Slater & Matsil, L.L.P.

(57) ABSTRACT

A flow meter device is coupled to at least one sensor that measures a flow speed and provides status signals from which the flow speed can be determined. The flow meter receives and processes the flow measurement data provided by the at least one sensor. The at least one sensor is enabled at defined time instances for a defined interval time. The flow meter receives at least one status signal from the sensor each time the sensor is enabled and processes the status signals to generate a trigger event when certain conditions arise. A processing unit wakes up from a sleep mode when a trigger event is generated by the flow meter device.

20 Claims, 5 Drawing Sheets

FLOW METER DEVICE AND METHOD OF OPERATION

TECHNICAL FIELD

The present disclosure relates to a flow meter device and, in particular embodiments, to a flow meter device for measuring and controlling a flow.

BACKGROUND

In general, flow meters are devices that measure the amount of liquid, gas or vapor that passes, for example, through a pipeline. Flow can be measured in a variety of ways. Both gas and liquid for example can be measured in volumetric or mass flow rates. The volumetric flow rate, for example, is the volume of fluid which passes through a given surface per unit time, e.g., cubic meters per second.

A flow meter is generally an arrangement, which consists of several components. Known electronic count flow meters include one or more sensors, an optical or electronic sensor interface, a microcontroller and in most cases some kind of display and communication. A flow meter might also be able to control a valve, for example, in order to control the flow. The microcontroller in known electronic count flow meters typically performs the sampling of the sensors, receives the measurement signals and processes them. Through an interface, the microcontroller can then access the display to make the results of the measurements visible to a user. In case the microcontroller detects, that the flow is too fast or too slow, it could control and adjust the flow, by opening or closing a valve, for example.

In order to keep track of the flow to be measured, sampling of the sensors has to be performed at regular intervals. For this, the microcontroller needs to be in an active state. During intervals, in which no sampling is performed, the microcontroller can change into a sleep mode to reduce power consumption.

Flow meters are often battery powered. Therefore a low power consumption is desirable, to allow operation of the flow meter for typically at least up to 20 years, without the need of a battery change.

SUMMARY OF THE INVENTION

A flow meter device is disclosed. In accordance with one example of the present invention, the flow meter device coupled to at least one sensor, that measures flow speed and provides status signals from which the flow speed can be determined. At least one sensor is enabled at defined time instances for a defined interval time. At least one status signal is received from the sensor each time the sensor is enabled. The status signals are processed and a trigger event is generated, if certain conditions arise. A processing unit is coupled to the flow meter which wakes up from a sleep mode when a trigger event is generated by the flow meter device.

Further, a flow meter arrangement is disclosed. In accordance with another example of the present invention, the flow meter arrangement comprises at least one sensor, configured to measure a flow speed and to provide status signals from which the flow speed can be determined. A flow meter device is coupled to the at least one sensor. The flow meter device is configured to enable the at least one sensor at defined time instances for a defined interval time, to receive at least one status signal from the sensor each time the sensor is enabled. The status signals are processed and a trigger event is generated, if certain conditions arise. A processing unit is coupled to the flow meter device and is configured to detect a trigger event generated by the flow meter device and to wake up from a sleep mode when it detects a trigger event.

BRIEF DESCRIPTION OF THE DRAWINGS

Examples will now be explained with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION OF ILLUSTRATIVE EMBODIMENTS

In the following detailed description, reference is made to the accompanying drawings, which form a part thereof, and in which is shown by way of illustration specific embodiments in which the invention may be practiced. In this regard, directional terminology, such as "top," "bottom," "front," "back," "leading," "trailing," etc., is used with reference to the orientation of the figures being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that the features of the various exemplary embodiments described herein may be combined with each other, unless specifically noted otherwise.

Figure 1:
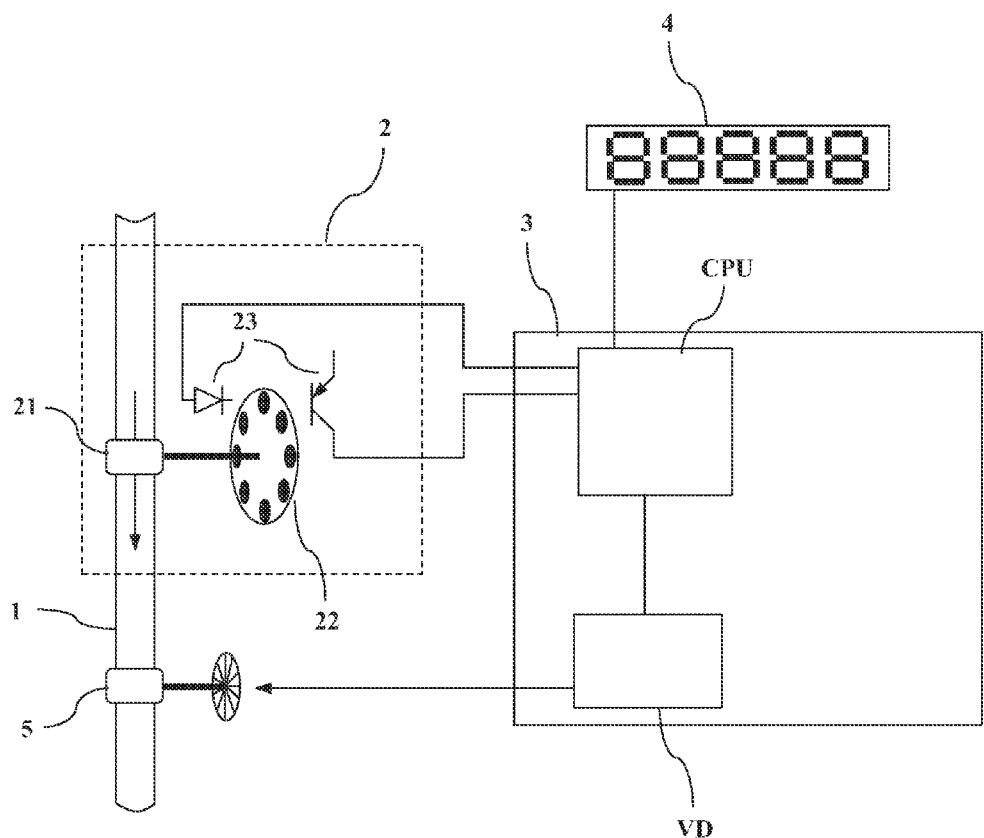
FIG. 1 illustrates in a block diagram the basic principle of a state of the art volumetric sensor arrangement.

In FIG. 1 the basic principle of a state of the art sensor arrangement for measuring a flow speed is shown. In this example, a volumetric flow sensor 2 is shown. However, volumetric flow sensors are only one type of sensors that can be used to measure a flow speed or flow rate. Other sensor types can be used as well to measure the amount or speed of liquid, gas or vapor that passes, for example, through a pipeline 1. The sensor 2 in such an arrangement has to be connected to the pipeline 1. The sensor 2 can be a mechanical flow sensor, which provides a mechanical movement proportional to the volume flow rate as its output. In this example, the sensor 2 is a wheel rotation sensor. In a wheel rotation sensor, a part 21 of the sensor is directly connected to the pipeline 1. In the part 21, there is a first wheel or a small propeller, for example, which rotates with the flow of the liquid or gas in the pipeline 1. If the liquid or gas is flowing fast, the wheel in the part 21 also rotates fast and if the liquid or gas is flowing slowly, also the wheel in the part 21 is rotating slowly. However, the rotation can be induced by many different sources. Another example would be a diaphragm meter.

A second wheel 22 is connected to the first wheel of the part 21. The two wheels have one axis connected to their centers. In this way, the rotation of the first wheel is transmitted to the second wheel 22. Typically, the second wheel 22 has holes or magnetic spots, for example. At least one sensor 23 is arranged in such a way, that it can detect a hole or a magnetic spot passing by, as the second wheel 22 is turning around. By detecting the holes or magnetic spots in turn to parts of the wheel without holes or magnetic spots, the rotating speed of the second wheel 22 can be determined. In this way, the fluid flow is transformed into rotation and can be measured. A certain wheel rotation speed then represents a certain flow speed.

The rotation detection can be realized, for example, by placing a magnetic sensor 23 near the rotating second wheel 22. In this case, magnetic spots are placed in regular intervals on the outer edge of the second wheel 22. The magnetic sensor 23 then detects the metallic spots passing by, as the wheel 22 rotates. Between two magnetic spots, there is always a non magnetic part of the wheel 22. In case optical sensors 23 are used, the wheel 22 has holes instead of magnetic spots, which are also placed in regular intervals on the outer edge of the second wheel 22. The optical sensor 23 can then detect the holes as the wheel 22 is turning around. However, these are only examples for the implementation of such a wheel sensor. There are also different ways to implement such a wheel rotation sensor.

The sampling rate of such a sensor normally depends on the maximum rotational frequency that should be detected, as well as on the overall system. The sampling is normally done by a central processing unit CPU, which is part of a flow meter arrangement 3. The central processing unit CPU can calculate a flow from the signal received from the sensor, regulate the flow in the pipeline 1, or send data to a display 4, for example. The signal received from the sensor can be flow measurement data or sensor status signals. The CPU can also perform further functions, if needed. For example, it could include a communication interface, to provide the measurement data to further components.

By sending measurement data to the display 4, a number of rotations of the wheel or the calculated fluid volume flow can be displayed, for example. In order to regulate the volume flow in the pipeline 1, the central processing unit CPU can be connected to a valve drive VD which is also part of the flow meter arrangement 3. The valve drive VD is further connected to a valve 5, which is connected to the pipeline 1. In case a high volume flow is measured, the valve 5 could be closed by the valve drive VD, for example, in order to reduce this volume flow. It would also be possible to open the valve 5, in order to increase the volume flow in the pipeline 1. The central processing unit CPU normally performs several functions as described above, at which the sampling of the volumetric flow sensor 2 is one of the most important functions.

Figure 2:
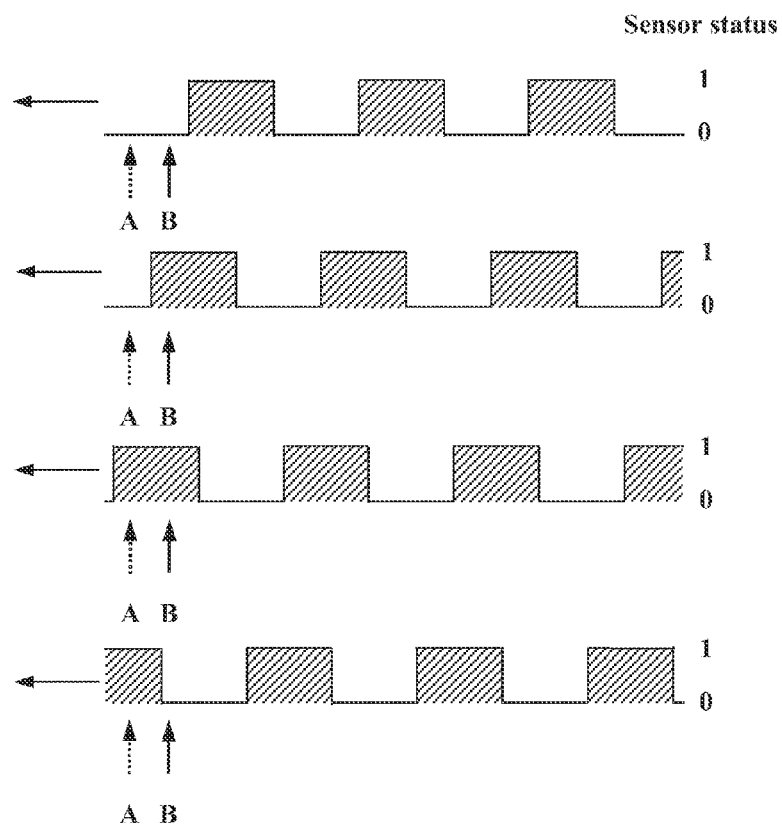
FIG. 2 illustrates the principle of the sampling with two sensors.

In FIG. 2, the general principle of the sampling of the wheel rotation sensor 2 with two sensors 23 is shown. The two sensors 23 are called A and B in this example. The principle is explained for a wheel rotation sensor 2 using an optical sensor. The second wheel 22 therefore has holes on its outer edge. However, the principle is the same, using different kinds of wheel rotation sensors. The sensors A and B are placed next to each other at a small distance. The sensors A and B provide a sensor signal which can take on two states. One sensor state (signal high, sensor state 1) represents the detection of a hole and the other state (signal low, sensor state 0) represents the detection of no hole. In FIG. 2, the parts where the signal is high (sensor state 1) are marked with dashed lines. FIG. 2 shows four different moments of sampling. The movement of the signal in the direction of the arrow represents the wheel rotation.

When the first sampling is performed, both sensors A and B detect no hole (sensor state 00). When the next sampling is performed, the wheel has turned and therefore sensor B now detects a hole, whereas sensor A still detects no hole (sensor state 01). When the next sampling is performed, the wheel has turned again, and both sensors A and B now detect a hole (sensor state 11). In the next step, the wheel again has turned, so that now sensor B detects no more hole, whereas sensor A still detects the hole (sensor state 10). The sensor status at each sampling moment is different from the sensor status of the preceding sampling moment.

The sampling has to be done in regular time intervals, in order to receive results, which correctly represent the volume flow. The sampling is done by the central processing unit CPU in known sensor arrangements. In order to do the sampling, the central processing unit CPU needs to be active. While being active, the current consumption of the CPU is quite high compared to the current consumption of the CPU when it is in a sleep mode. In order to reduce the overall current consumption, the CPU goes in sleep mode when no sampling is done. In sleep mode, the current consumption is normally reduced by about three orders of magnitude compared to the active mode.

Figure 3:
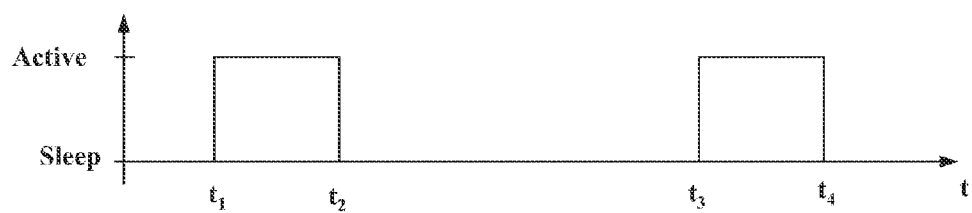
FIG. 3 illustrates on a time axis the activity of a CPU in a state of the art volumetric sensor arrangement.

In FIG. 3, the activity of a CPU in a typical state of the art volume flow sensor arrangement is shown. The CPU is in sleep mode until time instant $t_1$. It then wakes up to do the sampling and goes into an active mode for a certain time. At time instant $t_2$, the CPU goes back to sleep mode until it wakes up again at time instant $t_3$ to do the next sampling. It goes back to sleep mode at time instant $t_4$ when the sampling is completed. Typically, each sampling interval takes about 200 µs, depending on the kind of sensor used for the sampling and the time the CPU requires to perform the processing. The intervals in which the sampling is performed are typically 40 ms. This means that the CPU wakes up every 40 ms for a period of about 200 µs. Therefore, the average current consumption is rather high.

Figure 4:
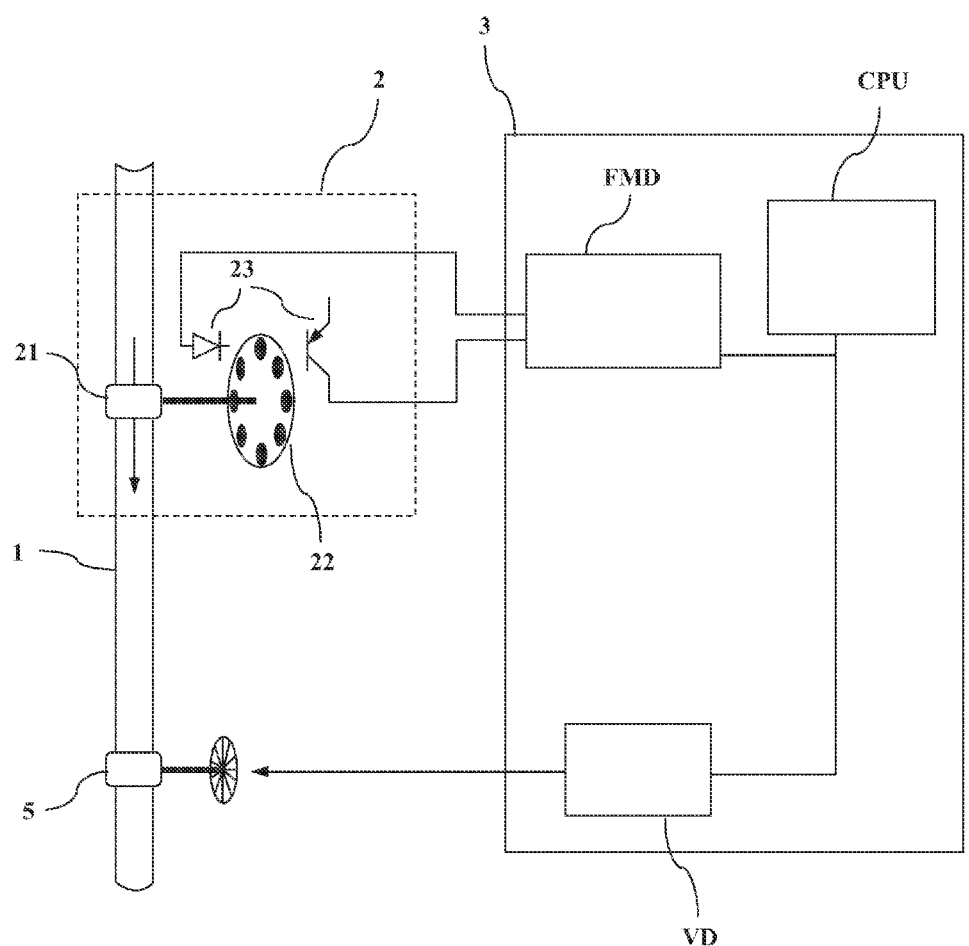
FIG. 4 illustrates in a block diagram the basic principle of the present invention.

In FIG. 4, one embodiment of the present invention is shown. In this example, also a wheel rotation sensor 2 is shown, but again any other volume flow sensor could be used instead. Additionally to the central processing unit CPU and the valve drive VD the flow meter arrangement 3 includes a flow meter device FMD. The flow meter device FMD is coupled to the sensor 2 and the CPU and takes over some of the functions which are performed by the CPU in state of the art meter arrangements. It could, for example, work as a coprocessor. The flow meter device FMD, for example, can perform the wheel speed measurement. It takes over the sampling, receives the sensor status signals and/or flow measurement data and processes these status signals and flow measurement data. The flow meter device FMD is configured to enable the sensor 2 every programmed sampling time for a certain interval time. The interval time should be long enough, to provide a stable condition to the sensor 2. The status of the sensor might be sampled at least once during the enabling interval. It might be sampled just before and after the sensor enabling window, for example. By sampling the status just before the enabling window, the flow meter device FMD can detect if the sensor is working properly. However, it could be sufficient to only measure the sensor status once during the enabling interval, or in other embodiments it might be necessary to sample the status even more often during each interval.

The CPU is no longer needed to perform the sensor sampling. It can stay in sleep mode, until it is woken up by the flow meter device FMD. The flow meter device FMD is configured to wake up the CPU in case certain conditions arise. These conditions might be the flow in the pipeline 1 being too slow or too fast, for example. The CPU might be woken up when needed, for example, to regulate the flow in the pipeline 1.

Figure 5:
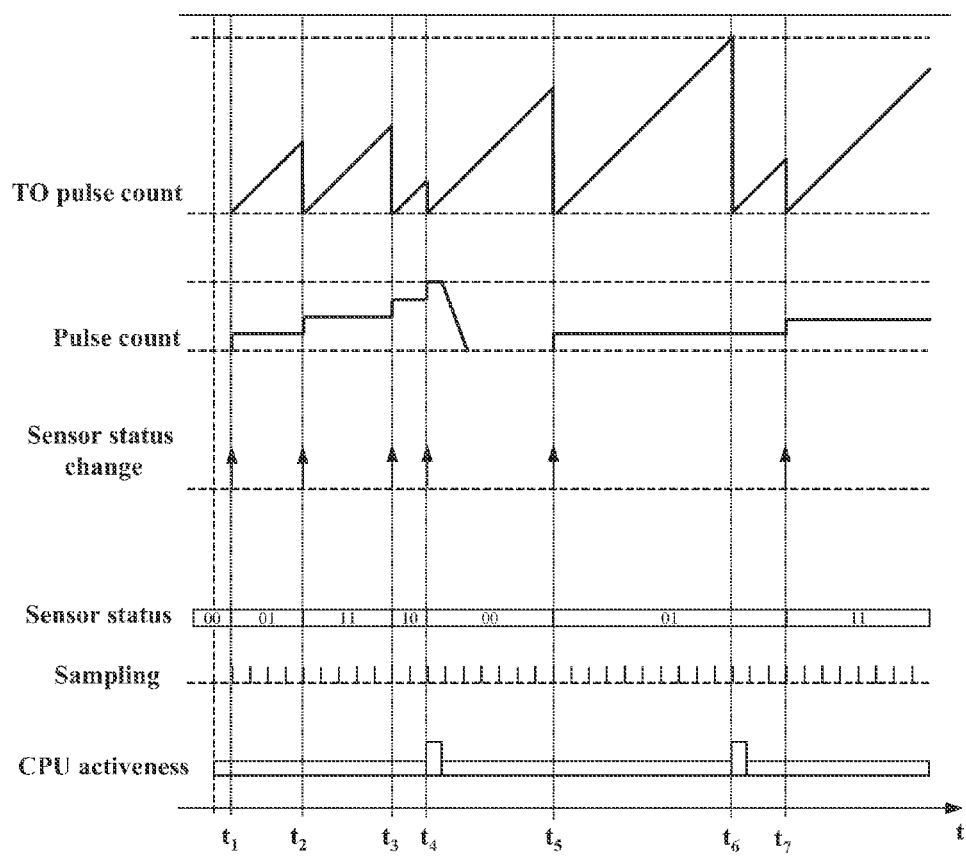
FIG. 5 illustrates on a time axis the sequence of events that lead to a CPU activation.

Waking up the CPU can be done by generating a trigger event. FIG. 5 shows an example, how trigger events could be generated by the flow meter device FMD. In FIG. 5, the sampling times, the sensor status, the time instants of a sensor status change as well as a pulse count and a TO pulse count are shown. The sensor status changes according to the principle which has been described in FIG. 2, using two sensors 23. A pulse count is increased, each time a sensor status change has been detected. A time overflow (TO) pulse count is increased over time and is reset, when a sensor status change is detected. After the reset it immediately starts to increase again. The more the TO pulse count increases, the longer no sensor status change has been detected, meaning that the flow speed in the pipeline is slow. If a sensor status change is detected often the flow speed is high, which is represented by a regular increase of the pulse count.

Before any sampling action is performed, the status of the sensor might be detected, in order to verify that the sensor is working properly and no tamper actions have been performed, for example. In case the sensor signal is found in a so called "don't care" state, no errors have occurred and the sampling can be performed. The sampling is done in regular time intervals. First, a sensor status 00 is detected by the flow meter device FMD, meaning that both sensors have detected no hole in the wheel. The sensor status changes to 01 at time instant $t_1$. This means that the wheel has turned and one of the sensors is now detecting a hole. When the sampling is done at time instant $t_1$, the flow meter device FMD detects this sensor status change. When a sensor status change is detected, the pulse count is increased by one and the TO pulse count starts a new cycle.

The following three times the sampling is performed, no sensor status change is detected. Therefore, the pulse count is not increased, while the TO pulse count continues to increase. At time instant $t_2$ the next sensor status change is detected. Therefore, the pulse count is increased and the time overflow pulse count is reset again. The same happens at time instant $t_3$. At time instant $t_4$ another sensor status change is detected. The pulse count is increased again, and now reaches a specified threshold. By reaching this threshold, a trigger event is generated and the CPU is woken up. The CPU is then active for a short while, to perform certain functions like regulating the flow speed, for example. The pulse count is reset when the CPU goes back to sleep mode.

The threshold of the pulse count might be programmable by the user. In this way, it could be adapted to the requirements of each arrangement. In case the pulse count threshold is reached often, within a rather short time interval, this means, that the flow speed is high. The CPU might therefore be woken up, in order to be able to regulate the flow speed, for example.

A trigger event is also generated, when the volume flow in the pipeline 1 is low and no sensor status change is detected for a long time. Such a case is shown between time instants $t_5$ and $t_7$. Between these time instants no sensor status change is detected, therefore the TO pulse count continues to increase and reaches a specified threshold at time instant $t_6$. When the TO pulse count reaches the threshold, a trigger event is generated and the CPU is woken up. The TO pulse count is reset at this time instant $t_6$. The TO pulse count threshold might be programmable by the user as well, to adapt it to the requirements of the arrangement.

Figure 6:
FIG. 6 illustrates on a time axis the activity of a CPU in a sensor arrangement according to the present invention.

By waking up the CPU only when a trigger event is generated, the CPU can stay in sleep mode for longer periods. FIG. 6 illustrates the activity of a CPU in a sensor arrangement according to the present invention. The CPU is in sleep mode until time instant $t_1$, wakes up to perform the needed functions and goes back into sleep mode at time instant $t_2$. The same happens at time instant $t_3$, when the CPU wakes up until time instant $t_4$. Like in sensor arrangements which do not use a flow meter device FMD, the CPU is active for about 200 μs each time it wakes up, but the periods when it is in sleep mode are much longer than in sensor arrangements as shown in FIG. 1. On average, the CPU only needs to wake up every 10 seconds, for example. In this way the average current consumption can be reduced by a great amount, compared to state of the art sensor arrangements.

Figure 7:
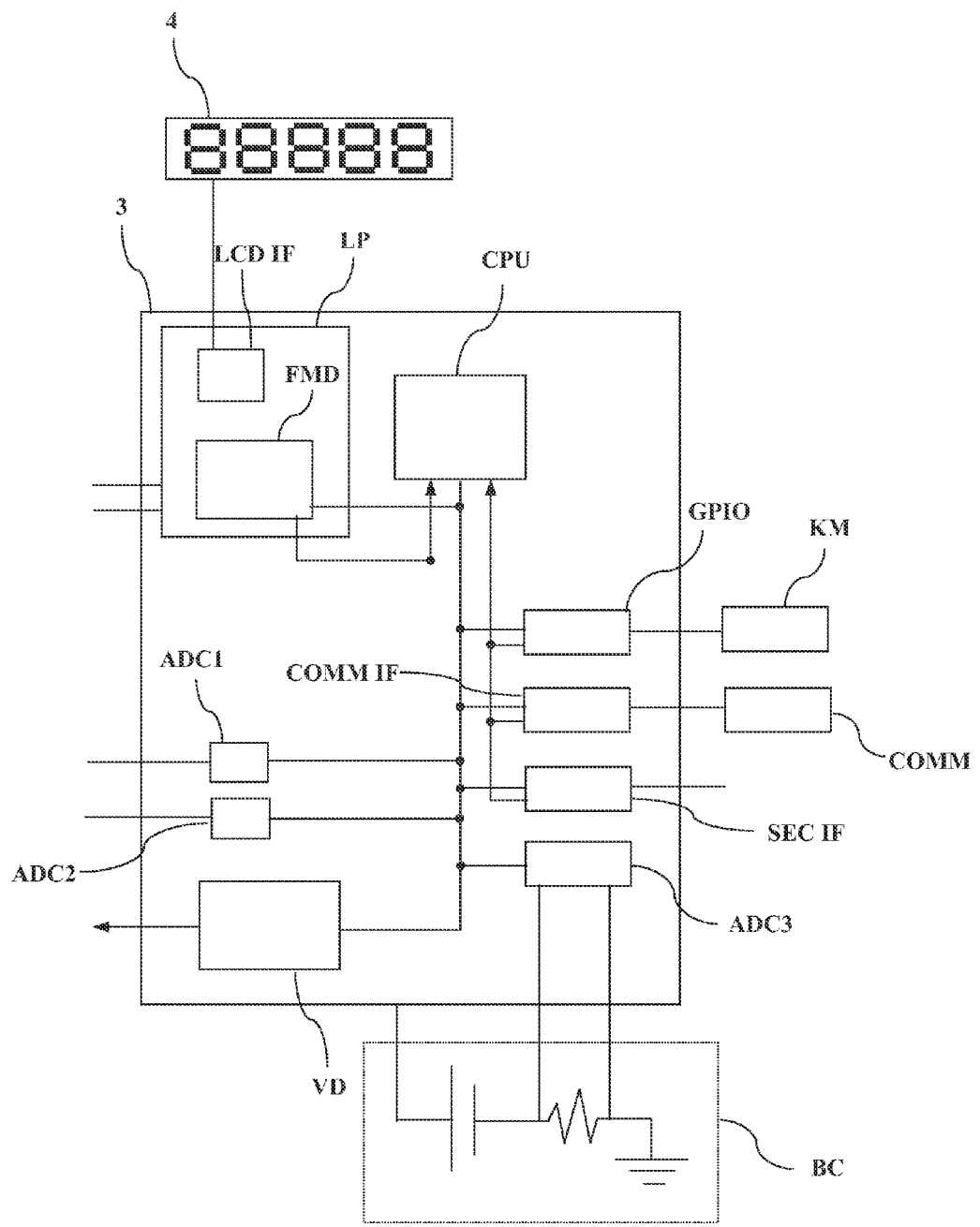
FIG. 7 illustrates in a block diagram an example of a volumetric sensor arrangement according to the present invention.

FIG. 7 shows one detailed example of how a flow meter arrangement 3 according to the present invention can be implemented. The flow meter arrangement 3 includes a low power area LP. In this low power area LP the flow meter device FMD and a display interface LCD IF might be arranged. The flow meter device FMD receives the status signals from the at least one sensor, which is connected to the pipeline. The flow meter device FMD can then process this sensor status data and calculate the volume flow. Through the display interface LCD IF it can send data to a display like an LCD monitor, for example. In this way, the user can read out the volume flow or a rotation speed of the wheel rotation sensor, for example. The user might be able to program the flow meter device FMD, in order to define, which information should be shown on the interface.

The low power area LP typically includes only the basic functions which are needed to perform the sampling and to determine the volume flow. Therefore, even when in active mode, it consumes less power than a typical CPU which includes additional functionalities. The flow sensor interface might go into sleep mode, while no sampling is performed. In this way the current consumption can be further reduced. The CPU, which is coupled to the low power area LP, also has a reduced average current consumption, as it only wakes up, when a trigger event is generated. Therefore, the overall current consumption of both the CPU and the low power area, is less, than in a flow meter arrangement in which the CPU performs all the functions, as it is shown in FIG. 1.

The flow sensor arrangement 3 might further include two analog-to-digital converters ADC1 and ADC2. These ADCs might be coupled to further sensors, a temperature and a pressure sensor, for example. In some embodiments, it might be possible to assume temperature and pressure to be constant. However, this is not always a valid assumption. Therefore in some embodiments it might be necessary to measure temperature, pressure and/or other parameters of the fluid or gas in the pipeline 1. Any number (including none) of analog-to-digital converters might be implemented in the flow sensor arrangement 3, according to the specific requirements.

A valve drive VD might be used within the flow sensor arrangement 3, in order to be able to regulate the flow in the pipeline 1, by opening or closing a valve connected to the pipeline 1. In some cases it might be necessary to keep the flow in the pipeline 1 constant. In other embodiments, it might only be necessary to get information about the flow rate, but regulation is not needed. In such cases the valve drive VD and the valve 5 might be omitted.

A third analog-to-digital converter ADC3 might be included in the flow sensor arrangement 3. This analog-to-digital converter ADC3 could be used, for example, to measure the current consumption of the flow sensor arrangement 3. Therefore, a battery control circuit BC might be coupled to the analogue-to-digital converter ADC3.

Further, a communication interface COMM IF and a communication module COMM might be included in the flow sensor arrangement 3. Through these components, the flow sensor arrangement 3 is able to communicate with further components (not shown). For example, data might be sent to a computer, where it can be stored and evaluated by a user.

The flow sensor interface might also include a general purpose input/output GPIO in some embodiments. A GPIO generally is a generic pin without any specific function which goes unused by default. In case, for example, an additional control line is needed, the GPIO can be programmed through software. In this way, no additional circuitry would be needed to provide an additional control line. For example, a key matrix KM might be connected to the GPIO. In this way, a user might program the flow meter device FMD or the CPU, for example. However, this is only one example of how a GPIO could be used. In other embodiments, other functions might be needed or, if no additional functions are needed, the GPIO could be omitted.

Sometimes it might be necessary to protect the data collected by the flow sensor 2. Therefore components might be included in the flow sensor arrangement 3, which can provide authentication, digitally sign the measurement data, manage digital keys or accelerate cryptoprocesses, for example. Such functions could be performed by an embedded cryptography implementation or by an external cryptography co-processor connected through a secure interface SEC IF, for example. By including such components, security features and data tampering protection might be implemented, if needed.

Spatially relative terms such as "under," "below," "lower," "over," "upper," and the like are used for ease of description to explain the positioning of one element relative to a second element. These terms are intended to encompass different orientations of the device in addition to different orientations than those depicted in the figures. Further, terms such as "first," "second," and the like, are also used to describe various elements, regions, sections, etc., and are also not intended to be limiting. Like terms refer to like elements throughout the description.

As used herein, the terms "having," "containing," "including," "comprising," and the like are open ended terms that indicate the presence of stated elements or features, but do not preclude additional elements or features. The articles "a," "an," and "the" are intended to include the plural as well as the singular, unless the context clearly indicates otherwise.

Although present embodiments and its advantages have been described in detail, it should be understood that various changes, substitutions and alterations can be made herein without departing from the spirit and the scope of the invention as defined by the appended claims. With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A flow meter device, which is configured
   to be coupled to at least one sensor, which is configured to measure a flow speed and to provide status signals from which the flow speed is determined;
   to receive and process the status signals provided by the at least one sensor;
   to enable the at least one sensor at defined time instances for a defined interval time;
   to receive at least one status signal from the at least one sensor each time the at least one sensor is enabled;
   to process the status signals and generate a trigger event if certain conditions arise; and
   to be coupled to a processing unit, which wakes up from a sleep mode when the trigger event is generated by the flow meter device.

2. The flow meter device according to claim 1, which is further configured to work as a coprocessor.

3. The flow meter device according to claim 1, wherein the time instances and the interval time for enabling the at least one volumetric sensor are programmable.

4. The flow meter device according to claim 1, wherein a status signal is received at a beginning of the defined interval time.

5. The flow meter device according to claim 1, wherein a status signal is received at an end of the defined interval time.

6. The flow meter device according to claim 1, wherein a pulse counter will be incremented, when a status signal of one sensor of the at least one sensor at a certain time instance is different from a preceding status signal of the same sensor.

7. The flow meter device according to claim 6, wherein the trigger event is generated, when the pulse counter crosses a defined threshold.

8. The flow meter device according to claim 6, wherein the trigger event is generated, when a defined time elapses, without the pulse counter being incremented.

9. A flow meter arrangement comprising:
   at least one sensor configured to measure a flow speed and to provide status signals from which the flow speed is determined;
   a flow meter device coupled to the at least one sensor and configured to enable the at least one sensor at defined time instances for a defined interval time, to receive at least one status signal from the at least one sensor each time the at least one sensor is enabled and to process the status signals and generate a trigger event if certain conditions arise; and
   a processing unit coupled to the flow meter device and configured to detect the trigger event generated by the flow meter device and to wake up from a sleep mode when the trigger event is detected.

10. The flow meter arrangement according to claim 9, further comprising a valve drive coupled to the processing unit and configured to regulate the flow speed.

11. The flow meter arrangement according to claim 10, wherein the processing unit is configured to control the valve drive to regulate the flow speed based on measurements performed by the at least one sensor.

12. The flow meter device according to claim 9, wherein the at least one sensor comprises a volumetric sensor.

13. The flow meter device according to claim 9, wherein the processing unit comprises a central processing unit.

14. A method of operating a flow meter device that is coupled to at least one sensor that measures a flow speed and provides status signals from which the flow speed is determined, the method comprising:
   receiving and processing the status signals provided by the at least one sensor;
   enabling the at least one sensor at defined time instances for a defined interval time;
   receiving at least one status signal from the sensor each time the sensor is enabled;

processing the status signals and generating a trigger event when certain conditions arise; and communicating with a processing unit to cause the processing unit to wake up from a sleep mode when the trigger event is generated by the flow meter device.

15. The method according to claim 14, wherein the time instances and the interval time for enabling the at least one volumetric sensor are programmable.

16. The method according to claim 14, wherein receiving at least one status signal comprises receiving a status signal at a beginning of the defined interval time.

17. The method according to claim 14, wherein receiving at least one status signal comprises receiving a status signal at an end of the defined interval time.

18. The method according to claim 14, further comprising incrementing a pulse counter when the status signal of one sensor of the at least one sensor at a certain time instance is different from a preceding status signal of the same sensor.

19. The method according to claim 18, wherein the trigger event is generated when the pulse counter crosses a defined threshold.

20. The method according to claim 18, wherein the trigger event is generated when a defined time elapses without the pulse counter being incremented.

* * * * *